June 14, 1955  V. MOEDERLE  2,710,659
WHEEL CHAIR AND TRACTOR COMBINATION
Filed April 4, 1952
FIG. 1
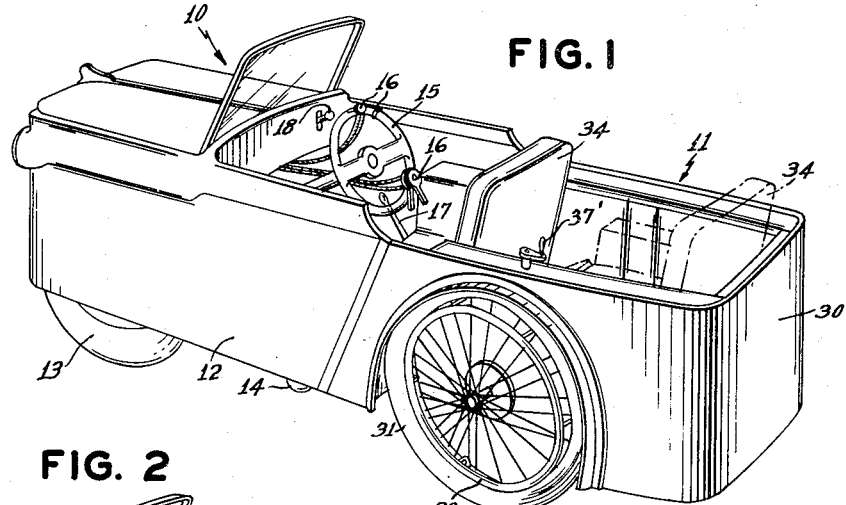
FIG. 2
FIG. 3
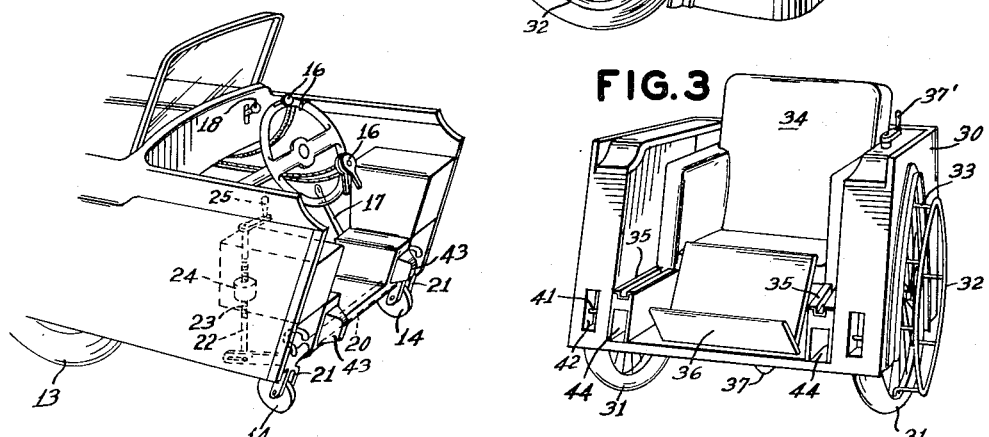
FIG. 4
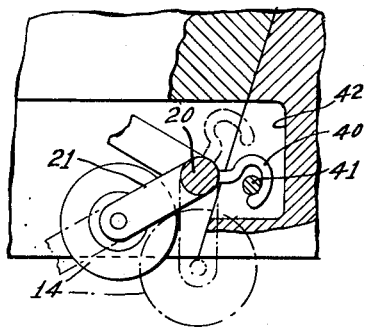
INVENTOR
*Vasco Moederle*
BY
ATTORNEYS

2,710,659
WHEEL CHAIR AND TRACTOR COMBINATION

Vasco Moederle, Gardone-Riviera, Italy

Application April 4, 1952, Serial No. 280,596

3 Claims. (Cl. 180—11)

This invention relates to motorized vehicles for non-ambulatory persons, and more particularly to a vehicle comprising a motorized unit and a wheel chair unit which may be used by those of the above category of persons who retain substantial use of their arms.

Numerous motorized vehicles have heretofore been proposed for use by such non-ambulatory persons whereby their area of movement or travel may be increased. As is well known, many of the leading automobile manufacturers have available for such persons automobiles which may be operated completely by hand, the operating controls all being located in the vicinity of or on the steering wheel. The limitations of this mode of travel for a non-ambulatory person are obvious, the main ones being, of course, the difficulties encountered by the person in getting into and out of such an automobile and the restriction of the use of such vehicles to roadways, streets, highways, etc.

Another attempt that has heretofore been made to aid the non-ambulatory person has been to provide a wheel chair carrying a motor of one sort or another by which the wheel-chair can be driven. This vehicle has the advantage that it may be used indoors or out, but has inherent disadvantages in that it is exceedingly heavy for manual operation by an occupant, and furthermore is not a satisfactory vehicle for the open road.

A further type of vehicle, the use of which has been proposed heretofore, is a motorized tractor unit adapted to push a standard wheel-chair and to be operated by an attendant for the occupant of the wheel-chair. The limitations of this type of vehicle will be readily apparent in that the occupant of the wheel-chair must always be accompanied by an attendant when the wheel-chair is being propelled other than manually by the occupant.

My invention, which overcomes all of the inherent disadvantages of the above heretofore proposed vehicles, resides broadly in the combination of a manually propellable wheeled vehicle, a motorized tractor unit, and means for detachably securing the wheeled vehicle to the tractor unit, the tractor unit being fully operable by an occupant of the wheeled vehicle when the latter is secured to the tractor unit.

More specifically, my invention comprises the above-set-forth combination of a manually propellable wheeled vehicle and motorized tractor unit in which all of the operating controls of the tractor unit are manually operable by the occupant of the wheeled vehicle and in which, furthermore, the means for detachably securing the wheeled vehicle to the tractor unit are manually operable by the occupant of the wheeled vehicle.

With such a motorized vehicle, a non-ambulatory person who is, however, possessed with substantial use of his arms may, completely on his own, travel substantial distances and when at his destination detach the tractor unit, parking it on the street or roadway, and from thenceforward manually propel himself in the relatively light wheeled vehicle.

While I contemplate various different forms of my invention, I will here more specifically describe my invention in connection with one form thereof as illustrated in the accompanying drawings in which:

Fig. 1 is a perspective view of a tractor unit and wheeled vehicle secured together for motorized operation;

Fig. 2 is a fragmentary perspective view of the tractor unit alone;

Fig. 3 is a perspective view of the wheeled vehicle wheel-chair alone; and

Fig. 4 is a sectional view of one type of apparatus for detachably securing the wheeled vehicle to the tractor unit.

Referring first to Figs. 1 through 3, the composite vehicle comprises a tractor unit indicated generally at 10 and a manually propellable wheeled vehicle or wheel-chair 11. The tractor unit 10 comprises a body 12 supported on a pair of drive wheels 13, only one of which is shown, and when detached from the manually operable wheeled vehicle 11, by a pair of retractible auxiliary supporting wheels 14. The drive wheels 13 are controlled for steering of the vehicle by a conventional steering wheel 15 connected thereto through conventional steering mechanisms not shown. The tractor unit 10 is further provided with a motor, preferably a conventional gasoline internal combustion engine, not shown, which drives the driving wheels 13. All of the controls for operation of the motor are located on the steering wheel 15 or closely adjacent thereto. These controls are rather diagrammatically illustrated at 16 and may include the conventional operating controls found in an automobile such as choke control, gas control or accelerator, etc. Additionally, the operating controls include a brake control for temporary use comparable to the standard foot pedal control of the conventional automobile. An emergency brake 17 is also provided for permitting braking when the tractor unit is parked. A gear shift lever or operating control 18 is also included and may be located as indicated in the vicinity of what might be termed the dashboard.

The various controls for the motor, the brakes, etc., of the tractor unit form no part of my invention except that they must be all manually operable and must be all readily accessible for manual operation by the occupant of the wheeled vehicle.

The retractible parking wheels 14 are mounted on a common shaft 20 by yokes 21 which are fixed to the shaft. An arm 22 also fixed to the shaft extends forwardly and is adjustably connected at its distal end to a vertical adjusting shaft 22 which may be treaded as at 23 and passed through a block 24 which is secured to the body of the tractor unit. At its upper end, upright shaft 22 is provided with a handle 25 by which it may be rotated to rotate shaft 20 and to pivot yokes 21 about the longitudinal axis of the shaft 20 to raise and lower auxiliary support wheels 14. The handle 25 is located in such a position as to be readily accessible for manual operation by the driver or occupant of the wheel-chair unit.

The wheeled vehicle or wheel-chair 11 comprises a body 30, which may advantageously be made of one of the lighter metals, supported on a pair of wheels 31. Each of the wheels 31 is provided with a circular, manually engageable member 32 supported outwardly from it by pin members 33. Members 32 are adapted to be readily grasped by an occupant of vehicle 11 whereby the supporting wheels 31 may be turned and the wheeled vehicle manually propelled. A rear supporting wheel 37 is provided to aid in the support of the wheeled vehicle when the latter is detached or separate from the tractor unit. This supporting wheel 37 is retractible, as are auxiliary supporting wheels 14 of the tractor unit. Any suitable mechanism may be employed for retracting supporting wheel 37, though such retracting means should be readily operable by the occupant of the wheeled vehicle. An operating handle 37' is illustrated in Figs. 1 and 3 by which the retracting means (not shown) may be operated readily by the occupant to retract or extend supporting wheel 37. Such retracting means may be of a type similar to that illustrated in connection with the tractor unit.

A chair or seat 34 for the occupant is adjustably mounted within the body 30 upon rails 35 (Fig. 3) and is movable thereon to two extreme positions. The solid line position of the seat 34, as seen in Fig. 1, is the position in which the seat is located when the wheeled vehicle 11 and the tractor 10 are secured together for motorized propulsion. The broken line position of the seat as seen in the same figure is the position in which the seat is located when the wheeled vehicle 11 is detached from the tractor unit 10 and is in condition for manual propulsion by its occupant. The mounting of the seat 34 on the rails 35 is such that it may be readily adjusted to its two extreme positions or to any intermediate position by its occupant and may include conventional manually operable locking means for locking the seat in its extreme positions as well as in various intermediate positions. The seat includes, as illustrated in Fig. 3, a foot and leg rest 36 for comfortable support of the occupant's legs at all times. It is contemplated that a chair 34 may be provided having a back section which may be inclined to various angular positions for the comfort of the occupant, and even to a horizontal position in which it might serve as a bed. Furthermore it is contemplated that a small folding seat may be included in the rear portion of the body of the wheeled vehicle to accommodate a passenger in addition to the occupant of chair 34. Such an auxiliary seat may also be employed in front of chair 34 when the chair is in its rearward position in order that the passenger might drive the combined vehicle at times, permitting the occupant of the chair 34 to rest.

Referring now particularly to Figs. 2 through 4, the means for detachably securing the manually propellable wheeled vehicle to the tractor unit will be described. It in fact comprises two separate units, one on each side of the composite vehicle, and a part of each being carried by the tractor with the other part of each carried by the manually propellable wheeled vehicle. Each unit comprises a hook-shaped clamping member 40 integral with or fixedly secured to the portion of wheel yokes 21 surrounding shaft 20. Thus each clamping member 40 is adapted to be pivoted about the axis of shaft 20 when the shaft itself is rotated by means of crank 25 and the interconnecting linkage. A pair of pins 41 are mounted within openings 42 in the front faces of the sides of the body 30 of the wheel-chair unit. In order to properly locate the tractor unit and wheel-chair unit relative to one another for operation of the clamping means to secure the two units together, and in order to assure a rigid connection between the two units, a pair of rearwardly extending lugs 43 are formed on the tractor unit and a pair of complementary openings 44 are provided in the front face of the wheel-chair unit. The lugs 43 are so shaped that they will initially enter openings 44 despite slight misalignment of the tractor and wheel-chair units and will perfect the alignment upon further relative movement of the two units together and in cooperation with the securing means will form a very rigid connection.

The securing and releasing positions of the detachable securing means are illustrated in Fig. 4 wherein the securing or locking position is illustrated in full lines and the releasing position in broken lines. It will be seen in this figure that when the two units are in engagement with lugs 43 of the tractor unit received by openings 44 of the wheel-chair unit and the auxiliary supporting wheels 14 of the tractor unit are retracted and in solid line position, the clamping members 40 engage the pins 41 to securely hold the two units together. When the occupant of the wheel-chair or driver of the composite vehicle has arrived at his destination and has lowered supporting wheel 37, he may lower the auxiliary supporting wheels 14 for the tractor unit by operating crank 25, at the same time moving the clamping members 40 to their dotted line positions as illustrated in Fig. 4 so that the wheel-chair unit is free to be manually propelled, the tractor unit remaining "parked."

The operation of the combined wheel-chair and tractor unit will be readily appreciated from the above description thereof, but in reiteration is briefly as follows: The wheel-chair unit with the chair 34 in its rearmost position, as illustrated in Fig. 3 and in broken lines in Fig. 1, may be readily, manually propelled by its occupant in the same fashion and in the same environments as is a standard wheel-chair. The wheel-chair unit is light and equally as maneuverable as is a standard wheel-chair. When the occupant wishes to travel on the open roadway over relatively long distances, he may himself propel the wheel-chair unit, in which he sits, to the tractor unit 10 and by simple manual operation, which may be easily performed by him, secure the wheel-chair to the tractor unit, at the same time retracting the auxiliary supporting wheels 14 that are employed only when the tractor unit is parked and not being used. He may then retract supporting wheel 37 by operating crank 37'. For driving the tractor unit, all of the controls of which are readily accessible to the occupant of the wheel-chair, the occupant will move the seat 34 to its solid line position as illustrated in Fig. 1.

The composite vehicle resembles somewhat a small automobile and may be driven quite safely by its occupant at speeds of 30 to 40 miles per hour or more. When he has reached his destination and wishes to detach the wheel-chair unit from the tractor unit, his first operation will be to move chair 34 rearwardly and operate crank 37' to extend supporting wheel 37. He then will operate crank 25, moving forward, if necessary, to retract clamp 40, thereby permitting detachment of the wheel-chair unit from the tractor unit. At the same time, as has been explained above, auxiliary supporting wheels 14 will be lowered to support the rear end of the tractor unit. The tractor unit may thus be parked and the occupant of the wheel-chair may thence propel himself manually in the wheel-chair unit itself.

Various changes and modifications in the apparatus illustrated and described may of course be made without departing from applicant's invention, and therefore the invention should be limited only to the extent set forth in the appended claims.

I claim:

1. In combination with a manually propellable wheeled vehicle, adapted to be occupied by a non-ambulatory person and having means manually engageable by an occupant for rotation of the wheels thereof, a motorized tractor unit, means for detachably securing said wheeled vehicle to said tractor unit, said tractor unit being operable by an occupant of said wheeled vehicle when said tractor unit is secured to said vehicle, and a seat movably mounted in said wheeled vehicle, said seat being movable to a forward position in which it is adapted to position an occupant for operation of the tractor unit and to a rearward position in which it is adapted to position the occupant so that he may manually grasp said wheel rotating means for manual propulsion of the wheeled vehicle when said wheeled vehicle is detached from said tractor unit.

2. The combination set forth in claim 1 in which the tractor unit has operating controls, all of which are manually operable by an occupant of said movable seat when said wheeled vehicle is secured to said tractor unit.

3. In combination with a manually propellable wheeled vehicle adapted to be occupied by a non-ambulatory person and having means manually engageable by an occupant for rotation of the wheels thereof, a motorized tractor unit, means for detachably securing said wheeled vehicle to said tractor unit, said tractor unit having operating controls all of which are manually operable by an occupant of said wheeled vehicle when said tractor unit is secured to said wheeled vehicle, said means for detachably securing the vehicle to the tractor unit being operable by an occupant of said vehicle and said wheeled vehicle being manually propellable by an occupant thereof when detached from said tractor unit, at least one auxiliary wheel retractably mounted on said tractor unit, means for retracting said wheel when the tractor unit and vehicle are to be secured together and for extending said wheel when said vehicle is to be detached from said tractor unit, said means being accessible for manual operation by an occupant of the wheeled vehicle, and a seat movably mounted in said wheeled vehicle, said seat being movable to a forward position in said vehicle in which it is adapted to position an occupant for operation of said tractor unit and to a rearward position in which it is adapted to position an occupant so that he may manually grasp said wheel rotating means for manual propulsion of the wheeled vehicle when said wheeled vehicle is detached from said tractor unit.

References Cited in the file of this patent

UNITED STATES PATENTS

| 653,578 | Lee | July 10, 1900 |
| 678,122 | Maxham | July 9, 1901 |
| 722,262 | Stone | Mar. 10, 1903 |
| 2,027,127 | Tastenhoye | Jan. 7, 1936 |
| 2,224,411 | Smith | Dec. 10, 1940 |
| 2,426,432 | Breckner | Aug. 26, 1947 |
| 2,495,573 | Duke | Jan. 24, 1950 |
| 2,512,995 | Berger | June 27, 1950 |
| 2,535,468 | Bank | Dec. 26, 1950 |

FOREIGN PATENTS

| 466,214 | Great Britain | May 25, 1937 |
| 467,304 | France | Mar. 27, 1914 |
| 530,924 | Great Britain | Dec. 24, 1940 |